US012808325B2

(12) United States Patent
Evans et al.

(10) Patent No.: US 12,808,325 B2
(45) Date of Patent: Nov. 24, 2026

(54) CRYO-ASSISTED BOTTOMING CYCLE HEAT SOURCE SEQUENCING

(71) Applicant: RTX CORPORATION, Farmington, CT (US)

(72) Inventors: Brandon M. Evans, San Antonio, TX (US); Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/770,803

(22) Filed: Jul. 12, 2024

(65) Prior Publication Data

US 2024/0360791 A1 Oct. 31, 2024

Related U.S. Application Data

(63) Continuation-in-part of application No. 17/871,270, filed on Jul. 22, 2022, now Pat. No. 12,560,124.

(51) Int. Cl.

| | |
|---|---|
| ***F02C 7/141*** | (2006.01) |
| ***F01K 23/08*** | (2006.01) |
| ***F02C 1/10*** | (2006.01) |
| ***F02C 3/22*** | (2006.01) |
| ***F02C 6/18*** | (2006.01) |
| ***F02C 7/32*** | (2006.01) |

(52) U.S. Cl.

CPC .............. *F02C 7/141* (2013.01); *F01K 23/08* (2013.01); *F02C 1/10* (2013.01); *F02C 3/22* (2013.01); *F02C 6/18* (2013.01); *F02C 7/32* (2013.01)

(58) Field of Classification Search

CPC .......... F01K 23/10; F01K 23/08; F02C 7/224; F02C 7/141; F02C 7/32; F02C 6/18; F05D 2260/10; F05D 2260/213; F05D 2260/232

See application file for complete search history.

(56) References Cited

U.S. PATENT DOCUMENTS

| | | | | |
|---|---|---|---|---|
| 4,896,499 | A | 1/1990 | Rice | |
| 11,448,133 | B2 | 9/2022 | Cocks et al. | |
| 11,485,504 | B2 | 11/2022 | Thomassin et al. | |
| 11,506,124 | B2 * | 11/2022 | Staubach | F02C 1/005 |
| 2004/0088993 | A1 * | 5/2004 | Radcliff | F01K 23/10 60/39.182 |
| 2012/0159923 | A1 * | 6/2012 | Freund | F02C 7/143 60/39.182 |

(Continued)

OTHER PUBLICATIONS

Extended European Search Report for European Application No. 25189383.0 mailed Dec. 5, 2025.

*Primary Examiner* — Devon C Kramer
*Assistant Examiner* — Henry Ng
(74) *Attorney, Agent, or Firm* — Carlson, Gaskey & Olds, P.C.

(57) ABSTRACT

An aircraft propulsion system includes a bottoming cycle where a working fluid is circulated within a closed circuit that includes a bottoming compressor section and a bottoming turbine section. A first heat exchanger provides for thermal energy from a first heat source to be input into the working fluid of the bottoming cycle. A second heat exchanger that is downstream from the first heat exchanger communicates additional thermal energy from a second heat source into the working fluid of the bottoming cycle after the thermal energy from the first heat source is input into the working fluid.

8 Claims, 4 Drawing Sheets

(56) References Cited

U.S. PATENT DOCUMENTS

| | | | | |
|---|---|---|---|---|
| 2014/0165572 | A1* | 6/2014 | Pang | F01K 3/12<br>60/736 |
| 2015/0096300 | A1* | 4/2015 | Gurin | F01K 23/04<br>60/668 |
| 2019/0249599 | A1* | 8/2019 | Sen | F02C 3/04 |
| 2020/0224590 | A1 | 7/2020 | Mcauliffe et al. | |
| 2021/0222619 | A1* | 7/2021 | Boucher | F02C 6/18 |
| 2021/0301720 | A1 | 9/2021 | Staubach et al. | |
| 2023/0212983 | A1* | 7/2023 | Sibilli | F02C 7/14<br>60/730 |
| 2024/0026824 | A1 | 1/2024 | Terwilliger et al. | |
| 2024/0133341 | A1* | 4/2024 | Smith | F01D 15/10 |
| 2024/0328358 | A1* | 10/2024 | Barth | F02C 3/20 |
| 2025/0084789 | A1* | 3/2025 | Sibbach | F02C 7/224 |

* cited by examiner

CRYO-ASSISTED BOTTOMING CYCLE HEAT SOURCE SEQUENCING

CROSS REFERENCE TO RELATED APPLICATION

This application is a continuation-in-part of U.S. application Ser. No. 17/871,270 filed on Jul. 22, 2022. The disclosures of U.S. application Ser. No. 17/871,270 are incorporated by reference in its entirety in this application.

TECHNICAL FIELD

The present disclosure relates generally to a bottom cycle for an aircraft propulsion system and more specifically to a bottoming cycle that utilizes a cryogenic fuel as a heat sink and reclaims waste thermal energy from various heat sources according to predefined hierarchy.

BACKGROUND OF THE INVENTION

Gas turbine engines typically include a compressor where inlet air is compressed and delivered into a combustor. In the combustor, the compressed air is mixed with fuel and ignited to generate an exhaust gas flow. The exhaust flow is expanded through a turbine section to generate shaft power used to drive the compressor and a propulsive fan. Some energy in the high energy exhaust flow is recovered as it is expanded through a turbine section. However, a large amount of energy in the form of heat is simply exhausted from the turbine section to atmosphere. A bottoming cycle utilizes recovered heat to generate additional useful work. A working fluid in the bottoming cycle is heated to drive a secondary turbine to generate additional shaft power. The working fluid in the bottoming cycle is then cooled, compressed, and reheated before expansion back through the turbine. The capability of the working fluid to accept heat limits energy recovery of the bottoming cycle.

SUMMARY OF THE INVENTION

An aircraft propulsion system according to an exemplary embodiment of this disclosure, among other possible things includes a core engine that includes a combustor where a cryogenic fuel is mixed with compressed air and ignited to generate an exhaust gas flow, a bottoming cycle where a working fluid is circulated within a closed circuit that includes a bottoming compressor section and a bottoming turbine section, the working fluid is compressed in the bottoming compressor section and expanded through the bottoming turbine section to generate shaft power, a first heat exchanger where thermal energy from a first heat source is communicated into the working fluid of the bottoming cycle, a second heat exchanger that is downstream from the first heat exchanger for communicating additional thermal energy from a second heat source into the working fluid of the bottoming cycle after the thermal energy from the first heat source is input into the working fluid, the second heat exchanger includes a capability of operating at temperatures greater than that of the first heat exchanger, a cryogenic fuel system that includes a cryogenic fuel storage tank, a fuel flow path for routing the cryogenic fuel to the combustor of the core engine, and a fuel/working fluid heat exchanger that provides thermal communication between a flow of the cryogenic fuel and the working fluid to cool the working fluid flow in the bottoming cycle.

In a further embodiment of the foregoing aircraft propulsion system, the second heat exchanger provides thermal communication of heat from the exhaust gas flow that is generated by the core engine to the working fluid of the bottoming cycle.

In a further embodiment of any of the foregoing aircraft propulsion systems, the first heat exchanger is in thermal communication with a core flow between stages in a compressor section of the core engine. Thermal energy from the core flow is communicated into the working fluid.

In a further embodiment of any of the foregoing aircraft propulsion systems, the first heat exchanger is in thermal communication with a bypass flow from a compressor section of the core engine. The bypass flow is bypassed from the compressor section around the combustor and into the turbine section.

In a further embodiment of any of the foregoing aircraft propulsion systems, the second heat exchanger is in thermal communication with a bypass flow from a compressor section of the core engine. The bypass flow is bypassed from the compressor section around the combustor and into the turbine section.

In a further embodiment of any of the foregoing, the aircraft propulsion system further includes a lubrication system that supplies a lubricant flow to locations within the core engine. The first heat exchanger is in thermal communication with the lubricant flow to communicate thermal energy between the lubricant flow and the working fluid of the bottoming cycle.

In a further embodiment of any of the foregoing aircraft propulsion systems, the first heat exchanger is in thermal communication with an aircraft system that is separate from the core engine. The first heat exchanger communicates thermal energy from the aircraft system into the working fluid of the bottoming cycle.

In a further embodiment of any of the foregoing, the aircraft propulsion system further includes an exhaust gas heat exchange that is downstream of the second heat exchanger where thermal energy from the exhaust gas flow is utilized to heat the cryogenic fuel flow before injection into the combustor.

In a further embodiment of any of the foregoing, the aircraft propulsion system further includes a generator that is driven by the bottoming turbine for generating electric power and an electric motor that is selectively coupled to a shaft of the core engine. The electric motor receives electric power from the generator for supplementing shaft power that is generated by a turbine section of the core engine.

In a further embodiment of any of the foregoing aircraft propulsion systems, the first heat exchanger and the second heat exchanger are in thermal communication with the working fluid flow flowing from the bottoming compressor to the bottoming turbine.

In a further embodiment of any of the foregoing aircraft propulsion systems, the first heat exchanger is upstream of the second heat exchanger in the bottoming cycle.

A gas turbine engine assembly according to another exemplary embodiment of this disclosure, among other possible things includes a top cycle that includes a compressor, combustor and turbine having an associated shaft, a mix of air and fuel is ignited in the combustor to generate an exhaust gas flow that is expanded through the turbine to drive the shaft and subsequently exhausted through an exhaust nozzle, a bottoming cycle that includes a bottoming compressor, a bottoming turbine, and a bottoming working fluid that is circulated within a closed bottoming circuit, a first heat exchanger where thermal energy from a first heat source is communicated into the working fluid of the bottoming cycle, a second heat exchanger that is downstream from the first heat exchanger for communicating additional thermal energy from a second heat source into the working fluid of the bottoming cycle after the thermal energy from the first heat source is input into the working fluid, the second heat exchanger includes a capability of operating at temperatures greater than the first exchanger, a cryogenic fuel system that includes a cryogenic fuel storage tank, and a fuel flow path for routing the cryogenic fuel to the combustor of the top cycle, and a fuel/working fluid heat exchanger that provides thermal communication between a flow of the cryogenic fuel within the fuel flow path and the working fluid to cool the working fluid flow in the bottoming cycle.

In a further embodiment of the foregoing gas turbine engine assembly, the second heat exchanger is disposed within the exhaust gas flow of the top cycle to provide thermal communication of heat from the exhaust gas flow to the working fluid of the bottoming cycle.

In a further embodiment of any of the foregoing gas turbine engine assemblies, the compressor of the top cycle includes at least two stages and the first heat exchanger is in thermal communication with a core flow between the at least two stages in the compressor of the top cycle. Thermal energy from the core flow is communicated into the working fluid.

In a further embodiment of any of the foregoing gas turbine engine assemblies, the first heat exchanger is in thermal communication with a bypass flow from a compressor section of the top cycle. The bypass flow is bypassed from the compressor section around the combustor and into the turbine section.

In a further embodiment of any of the foregoing gas turbine engine assemblies, the second heat exchanger is in thermal communication with a bypass flow from a compressor section of the top cycle. The bypass flow is bypassed from the compressor section around the combustor and into the turbine section.

In a further embodiment of any of the foregoing, the gas turbine engine assembly further includes a lubrication system that supplies a lubricant flow to locations within the top cycle. The first heat exchanger is in thermal communication with the lubricant flow to communicate thermal energy between the lubricant flow and the working fluid of the bottoming cycle.

In a further embodiment of any of the foregoing gas turbine engine assemblies, the first heat exchanger is in thermal communication with an aircraft system that is separate from the top cycle. The first heat exchanger communicates thermal energy from the aircraft system into the working fluid of the bottoming cycle.

In a further embodiment of any of the foregoing, the gas turbine engine assembly further includes an exhaust gas heat exchanger that is downstream of the second heat exchanger where thermal energy from the exhaust gas flow is utilized to heat the cryogenic fuel flow before injection into the combustor.

In a further embodiment of any of the foregoing, the gas turbine engine assembly further includes a generator that is driven by the bottoming turbine for generating electric power and an electric motor that is selectively coupled to a shaft of the top cycle. The electric motor receives electric power from the generator for supplementing shaft power that is generated by a turbine section of the top cycle.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

U.S. application Ser. No. 17/871,270 is incorporated herein, by reference in its entirety.

Figure 1:
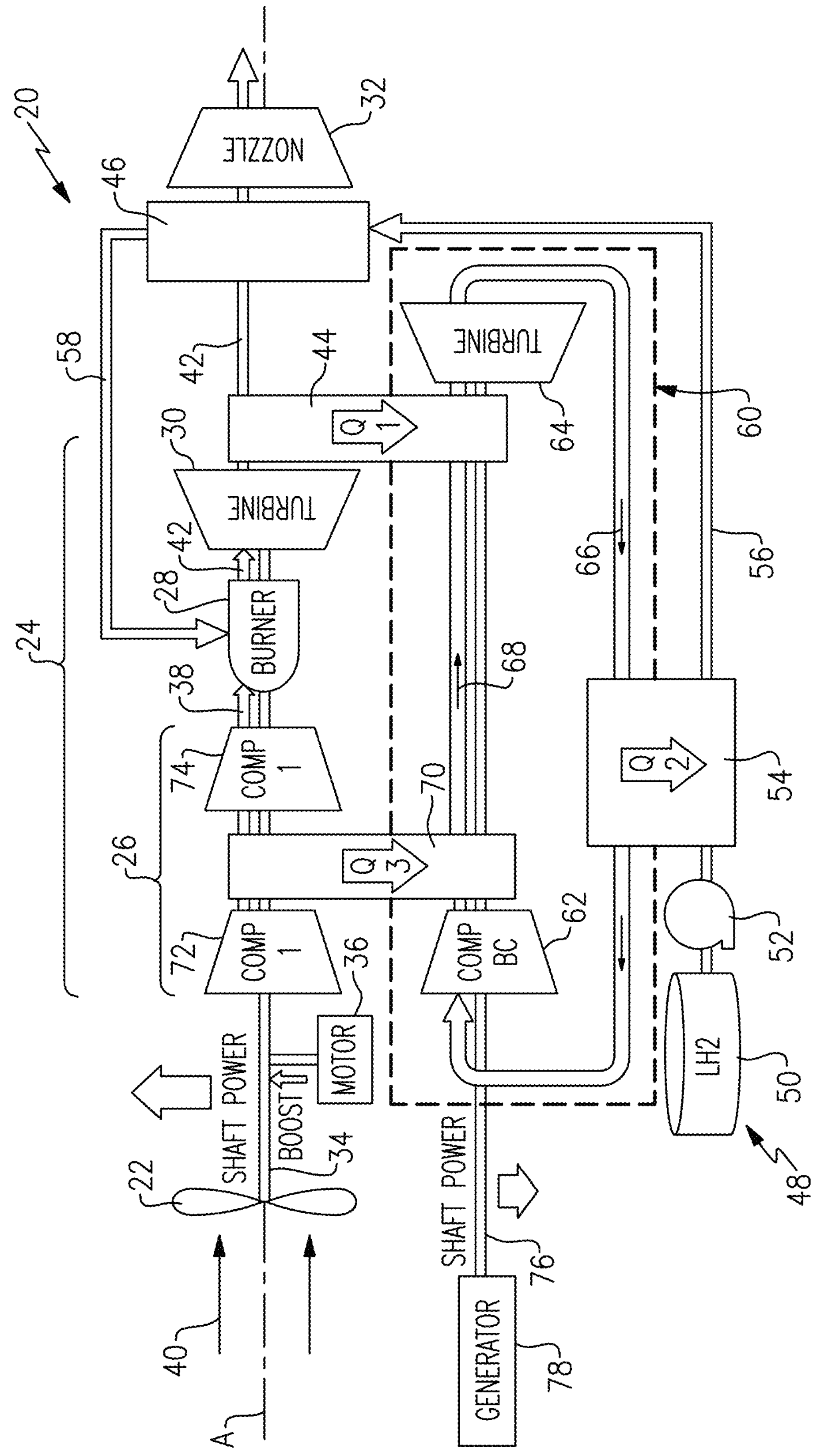
FIG. 1 is a schematic view of an example aircraft propulsion system including a bottom cycle for intercooling of a core flow through a core engine.

FIG. 1 schematically shows an aircraft propulsion system 20 that includes a bottoming cycle 60 with features improving heat absorption capability that provides improved operating efficiencies. In one disclosed example, the bottoming cycle 60 includes an intercooling heat exchanger 70 that captures waste heat from a core flow 38 within a compressor section 26 of a core engine 24. Cooling the core flow 38 increases compressor efficiency by reducing the amount of work required to achieve a desired pressure. Capturing the thermal energy from the core flow 38 in the bottoming cycle 60 improves system efficiency by reclaiming additional thermal energy to better utilize the heat sink provided by a cryogenic fuel flow.

The example propulsion system 20 includes a core engine 24 that generates shaft power utilized to drive a propulsive fan 22. The example core engine 24 includes a compressor section 26, a combustor section 28 and the turbine section 30 disposed along the longitudinal axis A. The fan 22 drives an inlet airflow 40 into the compressor section 26. The inlet flow 40 is compressed and communicated as pressurized core flow 38 to the combustor section 28 where it is mixed with a fuel flow 58 and ignited to generate an exhaust gas flow 42. The exhaust gas flow 42 expands through the turbine section 30 where energy is extracted and utilized to generate shaft power to drive an engine shaft 34. The engine shaft 34 drives the compressor section 26 and the fan 22. The exhaust gas flow 42 is subsequently exhausted through a nozzle 32.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A cryogenic fuel system 48 includes at least a fuel tank 50 and a fuel pump 52 to provide a liquid fuel flow 56 to the combustor 28. The example fuel system 48 is configured to provide a hydrogen based fuel such as a liquid hydrogen ($LH_2$). Although hydrogen is disclosed by way of example, other cryogenic, non-carbon based fuels could be utilized and are within the contemplation of this disclosure.

The fuel in the tank 50 incudes features for storing a cryogenic fuel at temperatures required to maintain the fuel in a liquid phase. Temperatures required to maintain the cryogenic fuel in a liquid phase may be as low as about −412° F. In one example embodiment, the cryogenic fuel is maintained at a temperature below 0° F. In another example embodiment, the fuel is maintained in the tank 50 at temperatures below −100° F. The cryogenic fuel may be maintained at temperatures below about −150° F. and as low as about −435° F.

The low temperatures of the cryogenic fuel 56 provides a source of heat absorption that is utilized in a bottoming cycle 60. The bottoming cycle 60 provides for recovering thermal energy otherwise lost as exhaust through the nozzle 32.

The example bottoming cycle 60 includes a bottoming compressor 62 that compresses a working fluid 68 and communicates that compressed working fluid to a bottoming turbine 64. In the bottoming turbine 64, the compressed working fluid 68 is expanded to drive a bottoming shaft 76. The shaft power generated by operation of the bottoming turbine 64 may be utilized to drive aircraft and engine accessory components. In one example disclosed embodiment, the shaft 76 is coupled to drive a generator 78 to generate electric power.

The working fluid flow that exits the bottoming turbine 64 is cooled by a fuel/working fluid heat exchanger 54. The cooled working fluid is communicated to the bottoming compressor 62 for compression. An intercooling heat exchanger 70 provides communication of a heat Q3 from the core flow 38 in the compressor section 26 of the core engine 24.

In one example embodiment, the compressor section 26 includes at least a first stage 72 and a second stage 74. The intercooling heat exchanger 70 cools the core flow 38 at a location between the first stage 72 and the second stage 74. The cooled core flow 38 improves compressor efficiency to improve operation of the core engine 24. Moreover, heat Q3 that is communicated into the working fluid flow in the bottoming cycle 60 is recovered in the form the of the shaft power generated by operation of the bottoming turbine 64.

The intercooling heat exchanger 70 provide the first input of heat in the form of the heat Q3 in to the working fluid after the bottoming compressor 62. A second, additional amount of thermal energy is input as heat Q1 from exhaust gas flow 42 in a first heat exchanger 44. The first heat exchanger 44 is disposed aft of the turbine section 30 of the core engine 24. The heat exchanger 44 places the exhaust gas flow 42 in thermal communication with the working fluid flow 68 of the bottoming cycle 60. In one example embodiment, the amount of thermal energy input as heat Q1 communicated from the exhaust flow 42 into the working fluid is much greater than that provided by the heat Q3 from the core flow 38 communicated through the intercooling heat exchanger 70. In another example embodiment, the heat input into the working fluid from the core flow 38 is higher than that of the exhaust gas flow 42. In such an embodiment, heat from the exhaust gas flow 42 may be input into the working fluid flow followed by additional heat input from the core flow 38.

The sequential input of heat into the working fluid is provided according to a predefined hierarchy that is based on the amount of thermal energy that may be provided and input into the working fluid flow. In the example embodiment, the lesser heat Q3 is input prior to the greater heat Q1 from the exhaust gas flow. The sequential input of thermal energy into the working fluid increases the efficiency of the heat recovery. Although in the example embodiment, the exhaust gas flow 42 is described as being hotter than other flows such as the core flow 38, it is within the contemplation of this disclosure that other flows, such as the core flow 38 may be of a temperature greater than the exhaust gas flow 42. Accordingly, in such an embodiment, the heat exchangers 44, 70 may be arranged to provide for the sequential input of the hotter core flow 38 after other cooler flows, such as the example exhaust gas flow 42. Moreover, heat from other flows within the engine and aircraft may be utilized and arranged to heat the working fluid flow in a defined order to maximize heat recovery.

The fuel/working fluid heat exchanger 54 places the working fluid in thermal contact with the liquid fuel flow 56. The fuel flow 56 accepts heat from the working fluid to cool the working fluid prior to introduction back into the bottoming compressor 62. The liquid fuel flow 56 is vaporized prior to introduction into the combustor 28 and therefore heat transferred from the working fluid is utilized to aid in heating of the fuel. An exhaust heat exchanger 46 is disposed downstream of the first heat exchanger 44 and provides further heating of the liquid fuel 56.

Shaft power generated by the bottoming turbine 64 is utilized to drive a generator 78 and produce electric power. The produced electric power may be used by other engine and aircraft systems. In one example embodiment, an electric motor 36 is coupled to the engine shaft 34. The electric motor 36 may be operated to input power to the engine shaft 34 to supplement power provided by the turbine 30. Although an example use of power from the bottoming cycle 60 is disclosed, other uses of the power recovered by operation of the bottoming turbine 52 are within the contemplation and scope of this disclosure.

Figure 2:
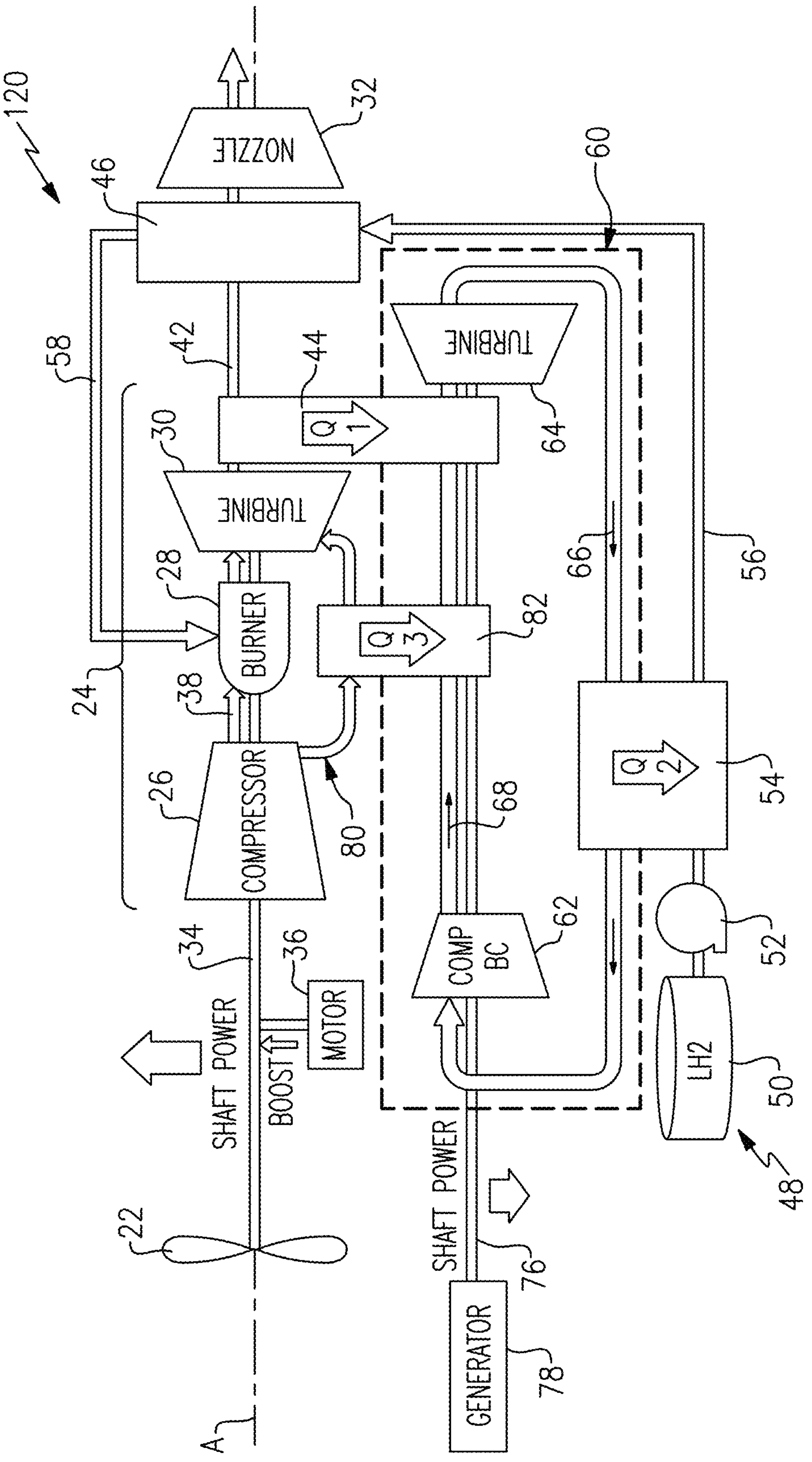
FIG. 2 is a schematic view of another example aircraft propulsion system including a bottom cycle for recovering thermal energy from a bypass cooling airflow.

Referring to FIG. 2, another aircraft propulsion system embodiment is schematically indicated at 120 and includes a core engine 24 that provides a cooling air bypass flow 80 into the turbine section 30 for cooling the turbine section 30. Cooling of the turbine section 30 requires air that is pressurized and therefore is drawn from a location in the compressor section 26 with a corresponding pressure. Work performed to pressurize air used as a cooling flow is lost as it is not expanded through the turbine section 30 to generate power. The bypass flow 80 is of some elevated temperature and therefore includes thermal energy indicated as Q3 in FIG. 2. The cooler the bypass flow 80, the less bypass flow that is required for cooling the turbine section 30.

The example propulsion system 120 includes a bypass heat exchanger 82 that communicates thermal energy from the bypass flow 80 into the working fluid after the being compressed as is indicated by arrow 68. The bypass heat exchanger 82 is disposed upstream of the first heat exchanger 44 that communicates the exhaust gas flow thermal energy into the working fluid flow 68. Both the bypass heat exchanger 82 and the first heat exchanger 44 are disposed between the bottoming compressor 62 and the bottoming turbine 64. Both the bypass heat exchanger 82 and the first heat exchanger 44 provide for heating of the compressed working fluid flow 68 prior to communication into the bottoming turbine 64. The hotter the compressed working fluid flow 68 is, the more energy that can be reclaimed by the turbine section 64. Accordingly, the increased amount of thermal energy provided by the bypass heat exchanger 82 improves overall engine efficiency.

In the example embodiment, the bypass heat exchanger 82 provides a lesser amount of thermal energy than the first heat exchanger 44. The bypass heat exchanger 82 provides thermal energy that may be of a lesser temperature than that provided by the first heat exchanger 44. The example propulsion system 120 operates to sequentially add thermal energy to the working fluid flow based on the amount of thermal energy available. Thermal energy is communicated into the working fluid flow 68 based on a hierarchy where lesser heat loads are communicated into the working fluid before larger heat loads. Accordingly, in the disclosed example embodiment, heat from the bypass cooling flow 80 is input through the bypass heat exchanger 82 into the working fluid flow 68 prior to heat energy from exhaust gas flow 42 through the first heat exchanger 44.

Figure 3:
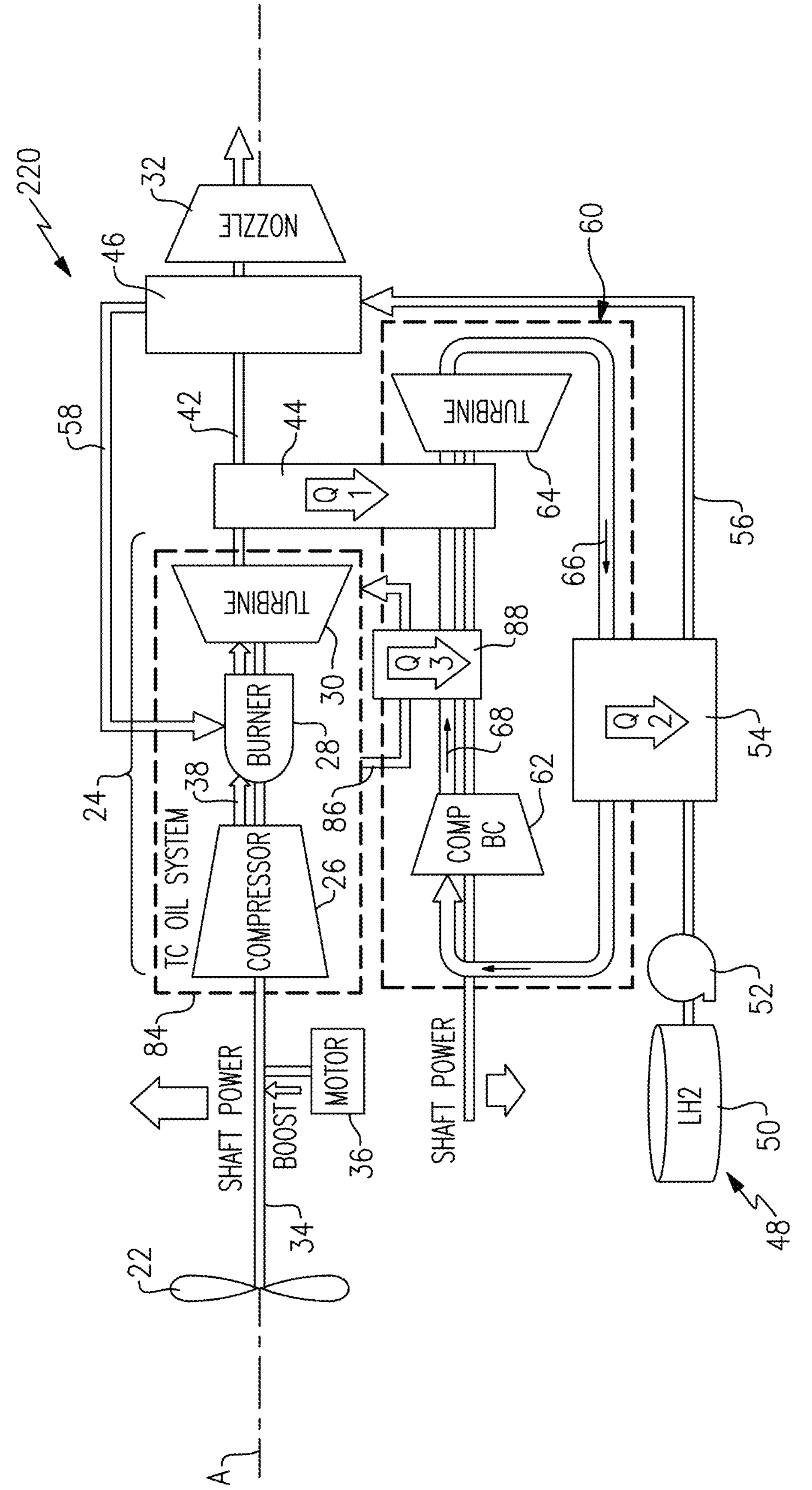
FIG. 3 is a schematic view of an example aircraft propulsion system including a bottom cycle for recovering thermal energy from a lubrication system.

Referring to FIG. 3, another example propulsion system is schematically indicated at 220 and illustrates a lubrication system 84 that includes a lubricant flow 86. The lubricant flow 86 is communicated through a lubricant heat exchanger 88 to communicate thermal energy from the lubricant into the working fluid flow 68. The heat energy available from the lubricant system 84 is limited and thereby is input into the working fluid flow prior to heat that may be input from the exhaust gas flow 42 through the first heat exchanger 44.

In the disclosed example propulsion system embodiments, thermal energy is input into the working fluid flow after the bottoming compressor 62 in a sequential order from lowest amount of thermal energy available to the highest amount of thermal energy available. Accordingly, heat from systems such as the lubricant system 84 are input prior to the input of heat from the much higher temperature exhaust gas flow 42.

Figure 4:
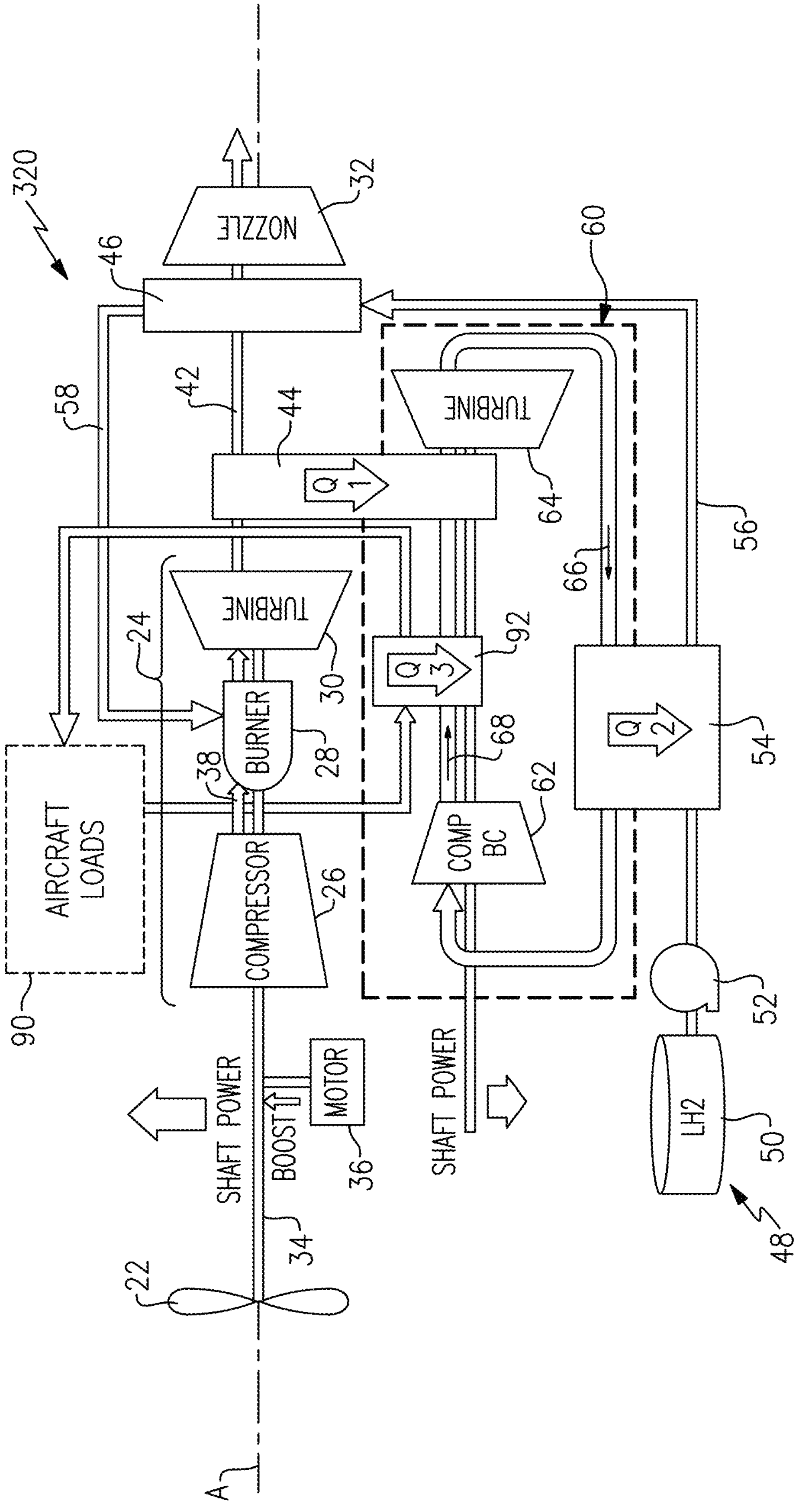
FIG. 4 is a schematic view of another example aircraft propulsion system including a bottom cycle for recovering thermal energy from an aircraft heat load.

Referring to FIG. 4, another example propulsion system is generally indicated at 320 and recaptures heat that may be produced by other aircraft loads schematically indicated at 90. Example aircraft loads 90 may include any system aboard an aircraft that generates heat and that would benefit from cooling. Such heat loads may originate from electric systems, hydraulic systems as well as power generating and storage systems. In this disclosed example, heat from various aircraft loads 90 are communicated through a heat load heat exchanger 92 into the working fluid flow 68 of the bottoming cycle 60.

The fuel system 48 utilizes the fuel working flow heat exchanger 54 to cool the working fluid flow schematically shown at 66 that has been exhausted from the bottoming turbine 64. The fuel working fluid heat exchanger 54 provides a first amount of heating to the fuel flow 56. An exhaust gas heat exchanger 46 is utilized to complete the vaporization of the fuel flow prior to communication into the combustor 28. In this disclosed example, the exhaust heat exchanger 46 is disposed downstream or aft of the first heat exchanger 44. The fuel flow 56 that is communicated through the exhaust gas heat exchanger 46 may be in a liquid form or a mix of liquid and vapor. Upon being heated within the exhaust gas heat exchanger 46, substantially all of the fuel flow 58 is in a vaporous form and is communicated to the combustor 28 of the core engine 24.

Accordingly, the example propulsion systems utilize a sequential arrangement of heat exchangers to take full advantage and recover as much waste heat as possible to increase overall engine efficiencies.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. An aircraft propulsion system comprising:

a core engine comprising a combustor where a cryogenic fuel is mixed with compressed air and ignited to generate an exhaust gas flow;

a bottoming cycle where a working fluid is circulated within a closed circuit comprising a bottoming compressor section and a bottoming turbine section, wherein the working fluid is compressed in the bottoming compressor section and expanded through the bottoming turbine section to generate shaft power;

an intercooling heat exchanger configured to provide a first input of thermal energy from a core flow between stages in a compressor section of the core engine into the working fluid in the bottoming cycle;

a second heat exchanger disposed downstream from the intercooling heat exchanger in the bottoming cycle and configured to communicate a second, additional input of thermal energy from the exhaust gas flow generated by the core engine into a flow of the working fluid of the bottoming cycle after the first input of thermal energy from the intercooling heat exchanger, wherein the second heat exchanger is configured for transferring a greater amount of thermal energy into the working fluid than the first input of thermal energy from the intercooling heat exchanger;

a cryogenic fuel system comprising a cryogenic fuel storage tank, a fuel flow path for routing the cryogenic fuel to the combustor of the core engine;

a fuel/working fluid heat exchanger providing thermal communication between a flow of the cryogenic fuel and the working fluid to cool the flow of the working fluid exhausted from the bottoming turbine section in the bottoming cycle; and an exhaust gas heat exchanger downstream of the second heat exchanger where the flow of cryogenic fuel is placed in thermal communication with the exhaust gas flow to heat the cryogenic fuel after cooling the flow of the working fluid exhausted from the bottoming turbine section before injection into the combustor, wherein the intercooling heat exchanger and the second heat exchanger are arranged to input thermal energy into the working fluid according to a predefined hierarchy of increasing thermal energy availability to maximize heat recovery by the bottoming cycle using the cryogenic fuel as a heat sink.

2. The aircraft propulsion system as recited in claim 1, further comprising a generator driven by the bottoming turbine section for generating electric power and an electric motor selectively coupled to a shaft of the core engine, the electric motor receiving electric power from the generator for supplementing the shaft power generated by a turbine section of the core engine.

3. The aircraft propulsion system as recited in claim 1, wherein the intercooling heat exchanger and the second heat exchanger are in thermal communication with the flow of the working fluid flowing from the bottoming compressor section to the bottoming turbine section.

4. The aircraft propulsion system as recited in claim 3, wherein the intercooling heat exchanger is upstream of the second heat exchanger in the bottoming cycle.

5. A gas turbine engine assembly comprising:

a top cycle comprising a compressor, a combustor and a turbine having an associated shaft, wherein a mix of air and a cryogenic fuel is ignited in the combustor to generate an exhaust gas flow that is expanded through the turbine to drive the associated shaft and subsequently exhausted through an exhaust nozzle;

a bottoming cycle comprising a bottoming compressor, a bottoming turbine, and a bottoming working fluid circulated within a closed bottoming circuit;

an intercooling heat exchanger configured to provide a first input of thermal energy from a core flow between stages of the compressor of the top cycle into the bottoming working fluid of the bottoming cycle;

a second heat exchanger downstream from the intercooling heat exchanger configured for communicating additional thermal energy from the exhaust gas flow into the bottoming working fluid of the bottoming cycle after the thermal energy from the core flow between stages of the compressor is input into the bottoming working fluid, wherein the second heat exchanger is configured to input a greater amount of thermal energy into the bottoming working fluid than the intercooling heat exchanger is configured to communicate into the bottoming working fluid;

a cryogenic fuel system comprising a cryogenic fuel storage tank, and a fuel flow path for routing the cryogenic fuel to the combustor of the top cycle; and a fuel/working fluid heat exchanger providing thermal communication between a flow of the cryogenic fuel within the fuel flow path and the bottoming working fluid to cool the bottoming working fluid in the bottoming cycle; and an exhaust gas heat exchanger downstream of the second heat exchanger where the flow of the cryogenic fuel is placed in thermal communication with the exhaust gas flow to heat the cryogenic fuel after cooling a flow of the bottoming working fluid exhausted from the bottoming turbine before injection into the combustor, wherein the intercooling heat exchanger and the second heat exchanger are arranged to input thermal energy into the working fluid according to a predefined hierarchy of increasing thermal energy availability to maximize heat recovery by the bottoming cycle using the cryogenic fuel as a heat sink.

6. The gas turbine engine assembly as recited in claim 5, wherein the second heat exchanger is disposed within the exhaust gas flow of the top cycle to provide thermal communication of heat from the exhaust gas flow to the bottoming working fluid of the bottoming cycle.

7. The gas turbine engine assembly as recited in claim 5, wherein the compressor of the top cycle comprises at least two stages and the intercooling heat exchanger is in thermal communication with the core flow between the at least two stages in the compressor of the top cycle, wherein thermal energy from the core flow is communicated into the bottoming working fluid.

8. The gas turbine engine assembly as recited in claim 5, further comprising a generator driven by the bottoming turbine for generating electric power and an electric motor selectively coupled to the associated shaft of the top cycle, the electric motor receiving electric power from the generator for supplementing shaft power generated by the turbine of the top cycle.

* * * * *